United States Patent
Koethe

[19]

[11] Patent Number: 6,024,074
[45] Date of Patent: Feb. 15, 2000

[54] REFRIGERATED FUEL FOR ENGINES

[75] Inventor: Terence Lee Koethe, Keller, Tex.

[73] Assignee: Fuel Dynamics, Keller, Tex.

[21] Appl. No.: 08/860,157

[22] PCT Filed: Mar. 17, 1997

[86] PCT No.: PCT/US97/04091

§ 371 Date: Jun. 17, 1997

§ 102(e) Date: Jun. 17, 1997

[87] PCT Pub. No.: WO97/36782

PCT Pub. Date: Oct. 9, 1997

[51] Int. Cl.⁷ .................................................... F02M 37/04
[52] U.S. Cl. ............................................................ 123/541
[58] Field of Search ........................ 123/541; 244/135 R, 244/135 A, 135 C

[56] References Cited

U.S. PATENT DOCUMENTS

| | | |
|---|---|---|
| 2,483,045 | 9/1949 | Harby . |
| 2,731,239 | 1/1956 | Andersen . |
| 3,390,528 | 7/1968 | Howell et al. . |
| 3,779,007 | 12/1973 | Lavash . |
| 3,874,168 | 4/1975 | Toure . |
| 4,155,337 | 5/1979 | Hensley . |
| 4,406,129 | 9/1983 | Mills . |
| 4,505,124 | 3/1985 | Mayer . |
| 4,683,921 | 8/1987 | Neeser . |
| 4,938,036 | 7/1990 | Hodgkins et al. . |
| 5,121,609 | 6/1992 | Cieslukowski . |
| 5,127,230 | 7/1992 | Neeser et al. . |
| 5,156,134 | 10/1992 | Tochizawa . |
| 5,163,409 | 11/1992 | Gustafson et al. . |
| 5,174,354 | 12/1992 | Neeser et al. . |
| 5,215,128 | 6/1993 | Neeser . |
| 5,228,295 | 7/1993 | Gustafson . |
| 5,228,585 | 7/1993 | Lutgen et al. . |
| 5,231,838 | 8/1993 | Cieslukowski . |
| 5,234,035 | 8/1993 | Neeser . |
| 5,251,603 | 10/1993 | Watanabe et al. . |
| 5,325,894 | 7/1994 | Kooy et al. . |
| 5,360,139 | 11/1994 | Goode . |
| 5,365,981 | 11/1994 | Peschka et al. . |
| 5,368,003 | 11/1994 | Clemente ................................. 123/541 |
| 5,373,702 | 12/1994 | Kalet et al. . |
| 5,375,582 | 12/1994 | Wimer . |
| 5,404,918 | 4/1995 | Gustafson . |
| 5,421,160 | 6/1995 | Gustafson et al. . |
| 5,421,161 | 6/1995 | Gustafson . |
| 5,421,162 | 6/1995 | Gustafson et al. . |
| 5,465,583 | 11/1995 | Goode . |
| 5,537,824 | 7/1996 | Gustafson et al. . |
| 5,558,303 | 9/1996 | Koethe et al. . |
| 5,590,535 | 1/1997 | Rhoades . |
| 5,601,066 | 2/1997 | Qutub ...................................... 123/541 |
| 5,616,838 | 4/1997 | Preston et al. . |
| 5,641,005 | 6/1997 | Kountz et al. . |
| 5,651,473 | 7/1997 | Preston et al. . |
| 5,832,903 | 11/1998 | White et al. ............................. 123/541 |

FOREIGN PATENT DOCUMENTS 3214874  11/1983  Germany .

OTHER PUBLICATIONS

Edwards Engineering Corp. Brochure, Form #94001–A, Sep. 1, 1996.

Primary Examiner—Marguerite McMahon
Attorney, Agent, or Firm—Mark W. Handley

[57] ABSTRACT

A method of fueling an engine (92) of a vehicle having a fuel storage tank (70) is accomplished by providing a liquid fuel for fueling the engine (92). The fuel is cooled to reduced temperatures substantially less than ambient temperature so that the volume of the fuel is reduced. The fuel is stored in the storage tank (70) while the fuel is at the reduced temperatures, with the reduced volume of the fuel thereby allowing more fuel to be held in the storage tank (70) and/or increasing the energy value of the fuel per unit volume. The fuel may be transferred from the storage tank (70) to the engine (92) while the fuel is at the reduced temperatures. The fuel may be cooled using either liquid nitrogen (76), or conventional mechanical refrigeration equipment (150).

27 Claims, 5 Drawing Sheets

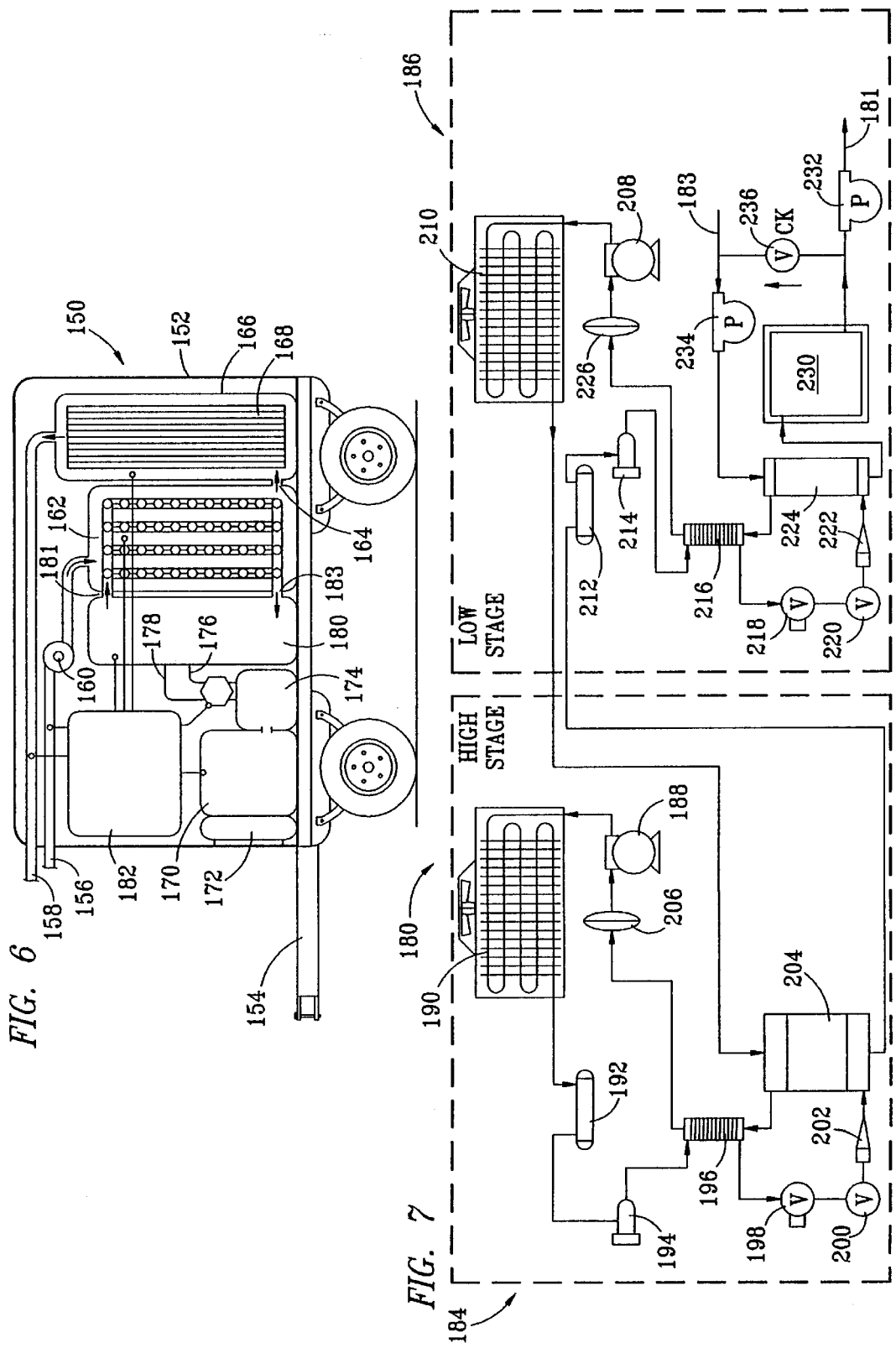

REFRIGERATED FUEL FOR ENGINES

CROSS REFERENCE TO RELATED APPLICATIONS

The present application is a National filing for entry into the National Phase of the PCT International patent application, having Serial Number PCT/US97/04091, filed on Mar. 17, 1997, which is a Continuation-in-Part of U.S. patent application Ser. No. 08/708,638 filed on Sep. 5, 1996, which is a Continuation-in-Part of U.S. provisional patent application Serial No. 06/013,636, filed on Mar. 18, 1996, and, in addition thereto, the present application claims priority as a Continuation-in-Part of the co-pending U.S. patent application Ser. No. 08/708,638, filed on Sep. 5, 1996, which is a Continuation-in-Part of U.S. provisional patent application Serial No. 06/013,636, all of which are entitled "REFRIGERATED FUEL FOR ENGINES" and invented by Terence Lee Koethe.

TECHNICAL FIELD OF THE INVENTION

The present invention relates to a method of fueling a vehicle engine, and in particular to a method of providing liquid fuel to aircraft and other vehicles.

BACKGROUND OF THE INVENTION

Air travel has become one of the most preferred modes of transportation when traveling over great distances. Modern jet aircraft are well equipped for sustained air travel at high speeds, enabling them to travel long distances in fairly short periods of time. Since jets and other aircraft can carry only a limited quantity of fuel, one of the major factors in limiting the distance over which aircraft can fly is the necessity for refueling. While in-flight refueling is possible today with some types of aircraft, most refueling is performed on the ground. These refueling stops prolong travel time. It is therefore desirable to increase the amount of fuel that can be stored on the aircraft, preferably with no or only minimal alterations to the existing aircraft structure.

It is known that the performance of reciprocating engines utilizing a fuel/air combustion mixture is improved with the introduction of cooled air. This is due to the increased density of the air, which results in higher oxygen availability for combustion. The cooled air also prevents premature combustion during the compression of the combustion mixture. Cooling of fuel for these engines utilizing existing air-conditioning equipment is also known and is used to reduce fuel vapors that may create vapor locks in fuel lines or to reduce lost fuel to the atmosphere as it evaporates from the fuel tank. The prior art also teaches the use of fuel cooled by means of an air conditioning system to cool the air introduced into the engine, and to retard vaporization of the fuel during compression to thus improve engine efficiency.

SUMMARY OF THE INVENTION

A method of fueling an engine of a vehicle having a fuel storage tank is accomplished by providing a liquid fuel for fueling the engine. The fuel is cooled to reduced temperatures which are substantially less than ambient temperatures, such that the volume of the fuel is reduced. The fuel is stored in the storage tank while the fuel is at the reduced temperatures, with the reduced volume of the fuel thereby allowing more fuel to be held in the storage tank and increasing the energy value of the fuel per unit volume. The fuel can be transferred from the storage tank to the engine while the fuel is at the reduced temperatures.

In one embodiment an aircraft having a fuel storage tank and an engine is fueled by providing a liquid fuel for fueling the aircraft. The fuel is cooled externally to the aircraft at a ground location. The fuel is cooled to reduced temperatures which are substantially less than ambient temperatures, such that the volume of the fuel is reduced. The fuel is transferred into the storage tank of the aircraft while the fuel is at the reduced temperatures, with the reduced volume of the fuel thereby allowing more fuel to be held in the storage tank of the aircraft and increasing the energy value of the fuel per unit volume.

In still another embodiment, a fuel powered vehicle having a passenger compartment and a fuel storage tank is fueled while providing conditioned air to the passenger compartment. This is accomplished by providing a liquid fuel in the storage tank of the vehicle for fueling the vehicle. The fuel is then cooled in the storage tank of the vehicle to reduced temperatures, which are substantially less than ambient temperature, using a coolant fluid. A heat transfer surface is also cooled below ambient temperature using the coolant fluid while maintaining the fuel at the reduced temperatures. Ambient air is passed over the heat transfer surface so that the air is cooled, and then the cooled air is passed into the passenger compartment of the vehicle.

BRIEF DESCRIPTION OF THE DRAWINGS

For a more complete understanding of the present invention and the advantages thereof, reference is now made to the following description taken in conjunction with the accompanying Drawings in which:

FIG. 6 illustrates a side elevational view of a portable refrigeration unit made according to the present invention;

FIG. 7 illustrates a schematic diagram depicting a two-stage, low temperature chiller for providing jet fuel at cryogenic temperatures according to the present invention.

DETAILED DESCRIPTION OF THE INVENTION

A significant reduction in the volume of liquid fuels used in organic combustion reactions can be obtained by drastically reducing the temperature of the fuel below ambient temperatures. The fuels utilized in this invention are primarily liquid petroleum distillate fuels, and include kerosene or jet fuels, aviation gasoline (avgas), and automobile gasoline. It should be apparent to those skilled in the art, however, that the invention could have application to other organic liquid fuel substances and should not be limited to those listed or described herein.

The invention has particular application in the field of aviation where fuel storage space is limited. By reducing the volume of the fuel prior to fueling, a greater mass of fuel can be stored for use on the aircraft. This increases the flight time of the aircraft, allowing it to travel greater distances before refueling.

The change in volume of kerosene or jet fuel can be approximated for every degree change in temperate by the following formula:

$$V_f = V_i - [V_i(0.0006/°F.)(T_i - T_f)]$$

where $V_f$ is the final volume, $V_i$ is the initial volume, $T_i$ is the initial temperature, and $T_f$ is the final temperature. Thus, one thousand gallons of jet fuel at 60° F. that is cooled to −15° F. will have a final volume of about 955 gal. This becomes especially significant on commercial aircraft where large amounts of fuel are stored and consumed. For instance, a typical "BOEING 747" may hold about 53,000 gallons of fuel. By reducing the temperature of the same volume of fuel from 60° F. to −40° F., a 100° F. temperature differential, this volume is reduced by about 3,180 gallons. This equates to over 20,000 pounds of fuel that can be added to the plane's fuel tanks. In other applications, cooling the temperature of the fuel beneath ambient temperatures by a temperature differential of 40° F. may be adequate to provide enhanced fuel capacity and to increase the energy level per unit volume of the fuel, such as cooling the fuel from ambient temperatures of 60° F. to a reduced temperature of 20° F. Additionally, in still other applications, it may be desirable to reduce the temperature of the fuel beneath ambient temperatures, yet maintain the fuel temperatures above 32° F. such that the freezing point of moisture in the ambient air will avoided.

Figure 1:
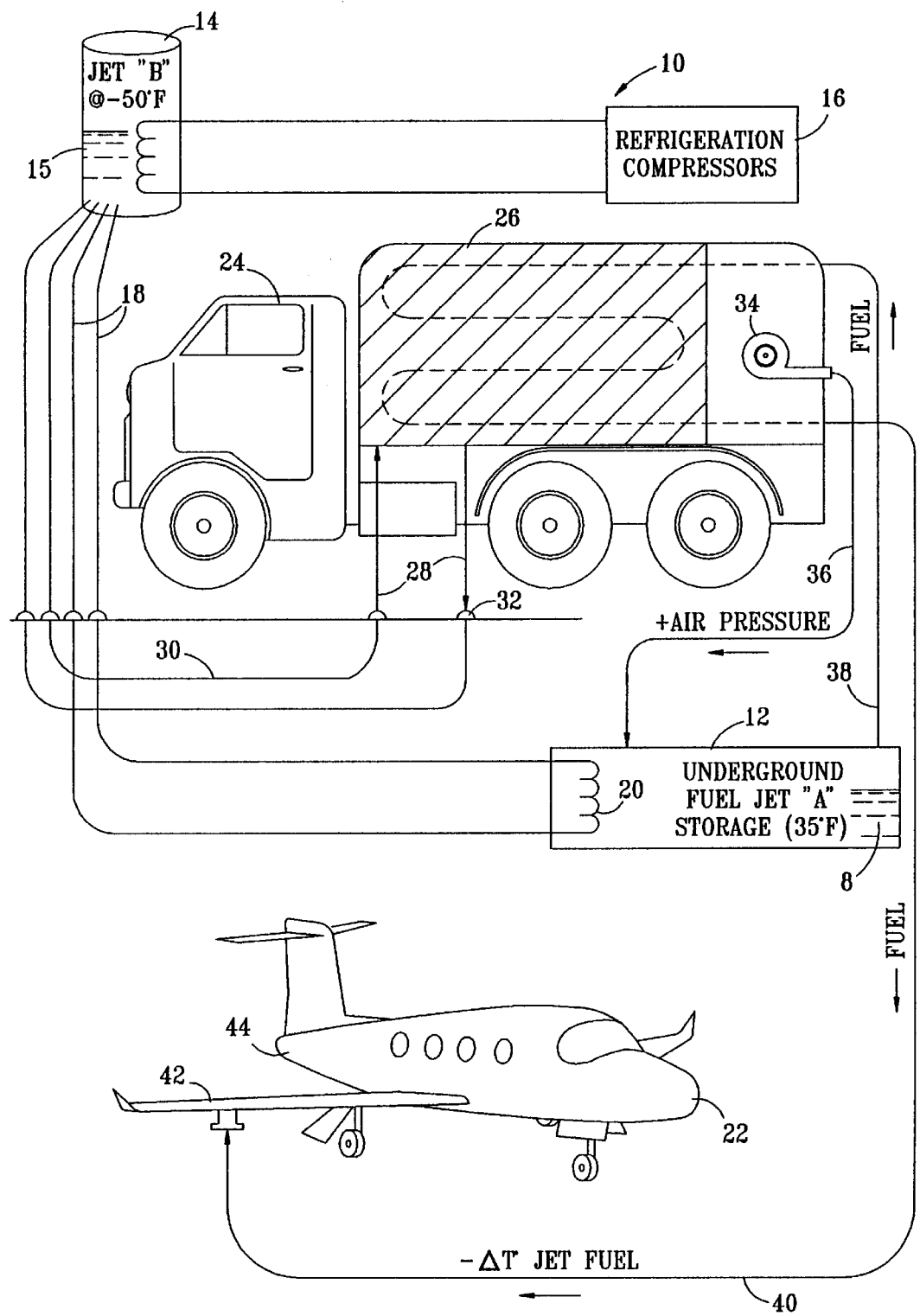
FIG. 1 illustrates a schematic representation of an aircraft being fueled in accordance with the present invention.

Referring now to FIG. 1, there is illustrated a fuel cooling system 10 for refrigeration of jet fuel 8 at a conventional airport facility. Typically, fuel is stored in underground tanks. In this particular case, Jet "A" grade fuel 8 is stored in an underground tank 12. Jet "A" fuel 8 is a warm-weather jet fuel that ceases to flow readily at temperatures below approximately −48° F. This is commonly referred to as the "pour point." Located at a nearby above-ground position is an insulated fuel storage tank 14. The tank 14 holds Jet "B" grade fuel 15. Jet "B" fuel 15 is a cold-weather fuel having a pour point of −58° F.

Fuel stored in the tank 14 is coupled to a refrigeration unit 16 that cools that the Jet "B" fuel within the insulated tank 14 to a temperature of about −50° F., which is above the pour point of the fuel. Insulated fuel lines 18 are coupled between the tank 14 and a heat exchange unit 20 which is located in an underground tank 12. By circulating the refrigerated Jet "B" fuel through the heat exchanger 20, the fuel stored in the tank 12 can be prechilled. The temperature of the fuel within the tank 12 should be monitored and the amount of cooling fuel circulated from the tank 14 should be controlled to prevent the temperature of the fuel within the tank 12 from dropping below 32° F. This is to prevent freezing of any existing water that might otherwise damage the tank or fittings. Preferably, the temperature of the fuel within the tank 12 is kept at 35° F.

When it is necessary to fuel an aircraft, such as aircraft 22, a mobile hydrant unit or a truck 24 carrying a heat exchanger 26 is positioned near the aircraft 22 and the underground tank 12, just as a conventional hydrant truck would be during fueling. Although various types of heat exchangers may be used for the heat exchanger 26, a plate-type heat exchanger has been found to be effective.

The heat exchanger 26 is connected via hoses 28 to insulated underground pipelines 30 at connections 32. The pipelines 30 feed and return the Jet "B" fuel from the tank 14 as it is circulated through the heat exchanger 26, where it acts as a coolant. As this is done, pressurized air from a compressor 34 is introduced into the underground tank 12 through a line 36. This forces the prechilled Jet "A" fuel through a line 38 into the heat exchanger 26, which is mounted on the truck 24, where the fuel is cooled even further.

The temperature of the refrigerated or chilled Jet "A" fuel may vary as it exits the heat exchanger 26. Preferably, the colder the fuel the better, provided the temperature of the fuel is maintained above the pour point of the fuel. Temperatures anywhere between 0 to −50° F. may be reached, with between −15 to −50° F. being preferred. In the particular example described, the Jet "A" fuel may be cooled to approximately −40° F., which is above the pour point of the fuel.

The cooled Jet "A" fuel is passed from the heat exchanger 26, through a fuel hose 40 and to the fuel tank 42 of the aircraft 22. The chilled Jet "A" fuel is then supplied to the engines 44 of the aircraft 22 as would normal temperature fuel. Increases in volume of the fuel due to warming usually are more than compensated for by the volume consumed during flight. The temperature of the fuel may rise only a few degrees per hour, but this is dependent upon ambient conditions. Because the cold-weather Jet "B" fuel is used as the coolant, leaks in either the heat exchanger 20 or the heat exchanger 26 do not present a major concern, as would exist if a non-jet-fuel coolant were used. Although the system of FIG. 1 utilizes a second refrigerated fuel as the coolant, liquid nitrogen may also be used to quickly reduce the temperature of elevated or ambient temperature fuels to sub-zero temperatures.

Figure 2:
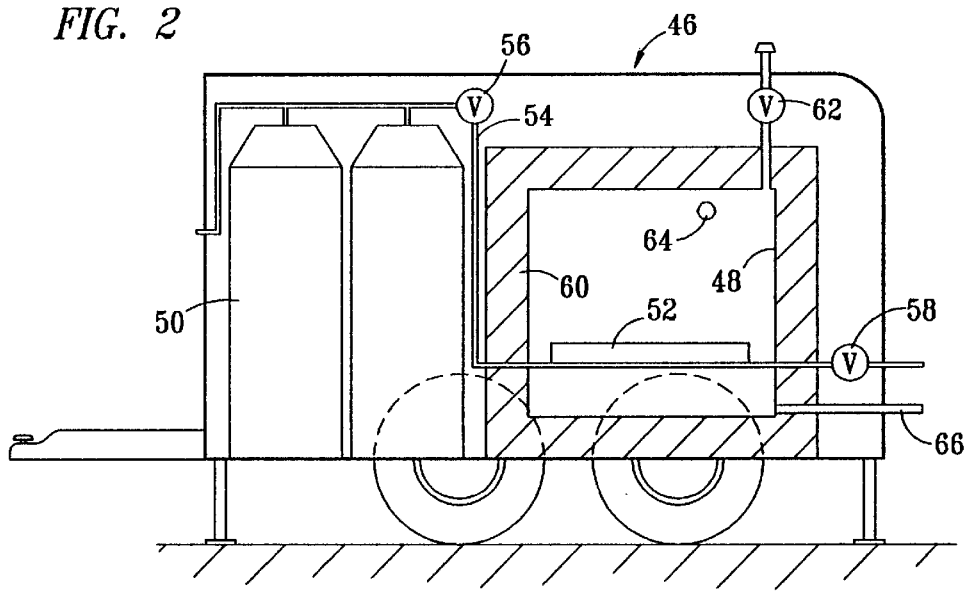
FIG. 2 illustrates a mobile refrigeration unit used in cooling fuel in accordance with the present invention.

Referring now to FIG. 2, there is illustrated a device 46 employing liquid nitrogen for cooling fuel. The device 46 is shown as a trailer, so that it may be moved to desired locations if needed, however, it may be stationary as well. The device 46 may be provided with a pump or compressor (not shown), such as the compressor 34 of FIG. 1, to deliver fuel to an aluminum fuel tank 48 of the device 46. Liquid nitrogen is stored in Dewar tanks or vessels 50. The number and size of tanks will depend on the quantity of fuel being cooled. It has been found that 5,000 gallons of liquid nitrogen is adequate to reduce the temperature of 16,000 gallons of jet fuel by 100° F.

A cryogenic heat exchanger 52 is disposed within a tank 48. Materials of the heat exchanger 52 are preferably non-ferrous materials, such as aluminum or brass. Stainless steel may also be used, however, ferrous materials tend to become brittle at extremely low temperatures. The heat exchanger 52 is connected to the nitrogen tanks 50 by an insulated liquid nitrogen supply line 54. A control valve 56 regulates introduction of nitrogen into the heat exchanger 52. Temperature probes and suitable controls (not shown) should be provided to ensure that the fuel is cooled and maintained at the desired temperature. A pressure relief valve 58 is provided for venting nitrogen from the heat exchanger 52 to the atmosphere.

Insulation 60, such as EPS foam, or a vacuum chamber, surrounds the fuel tank 48. A pressure relief valve 62 is provided with the tank 48 to vent fuel vapors to the atmosphere if necessary. An inlet 64 of the tank 48 allows ambient temperature fuel to be cooled to flow into the tank 48. Cold fuel is withdrawn from the tank 48 through an outlet 66. A suitable delivery hose, a pump, a nozzle, a filter and metering equipment (not shown) may be provided with the tank 48 and coupled to the outlet 66.

To use the device 46 of FIG. 2, ambient or warm temperature fuel is pumped into the tank 48 through the inlet 64. As the tank 48 is filled, the control valve 56 is opened to allow liquid nitrogen to flow from the tanks 50 to the heat exchanger 52 so that the fuel within the tank 48 is cooled. Nitrogen gas exits the heat exchanger 52 and is vented to the atmosphere through the valve 58. As the fuel is cooled to the desired temperature, it is withdrawn from the tank 48 through the outlet 66 and supplied to the fuel storage tank(s) of the vehicle or aircraft being fueled. It should be apparent that the fuel cooled by means of the device 46 may be cooled as a batch or may be fed continuously through the tank 48 so that a continuous stream of cooled fuel is supplied. Appropriate controls should be provided to ensure that the fuel exiting the tank 48 is maintained at the desired temperature.

Figure 3:
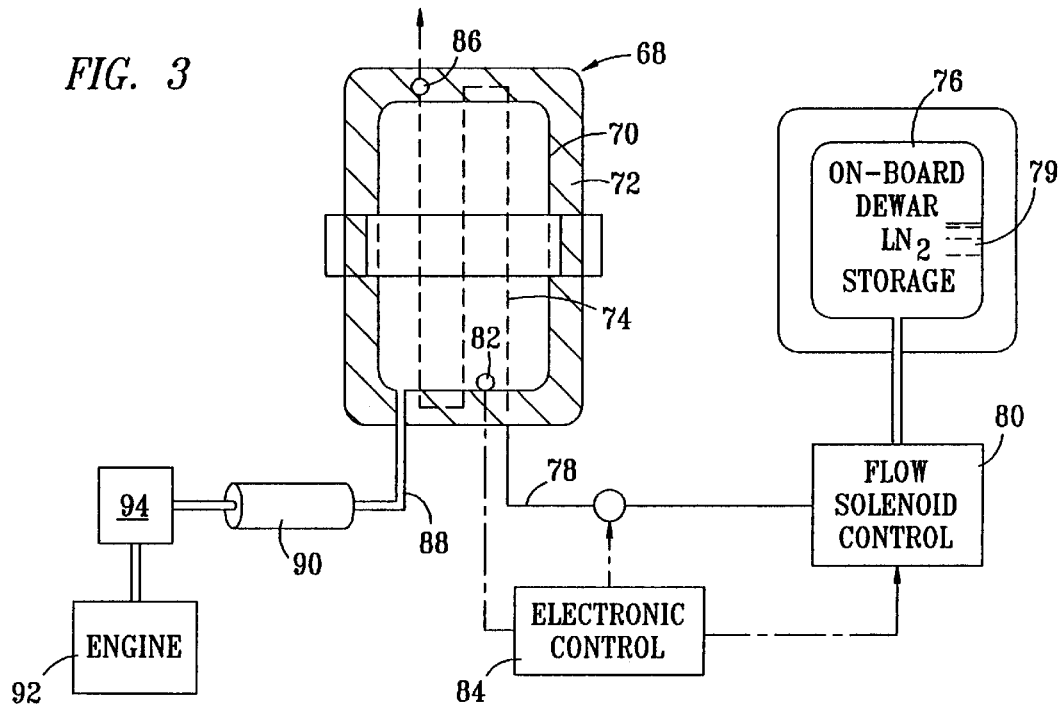
FIG. 3 illustrates a schematic representation of a refrigeration unit for a fuel tank constructed and used in accordance with the present invention.

Referring now to FIG. 3, there is illustrated an on-board device 68 for cooling fuel in the fuel storage tank of a vehicle itself While this embodiment has particular application to automobiles, it could also be used for aircraft and other vehicles. The device 68 includes a fuel storage tank 70 surrounded by a layer of insulation 72. A heat exchanger or cooling coils 74 are disposed within the tank 70. The heat exchanger 74 is coupled to an on-board liquid nitrogen tank 76 by an insulated nitrogen line 78. The nitrogen tank 76 is a Dewar vessel to prevent excessive warming of nitrogen 79.

A solenoid valve 80 is provided for regulating the flow of nitrogen coolant to the heat exchanger 74. A temperature probe 82 is disposed within the tank 70 and is coupled to electronic controls 84 which control the valve 80 to regulate the flow of nitrogen to the heat exchanger 74 when the temperature of fuel within the tank 70 reaches a preselected level. A nitrogen pressure relief valve 86 vents nitrogen to the atmosphere after it has passed through the heat exchanger 74.

A fuel line 88 of the vehicle is surrounded by insulation 90 and communicates between the vehicle's engine 92 and the fuel tank 70. A secondary heat exchanger 94 may be provided if necessary to further cool the fuel as it is passed through the fuel line 88. The heat exchanger 94 may consist of a thermoelectric chiller or be connected to a secondary nitrogen line (not shown) connected to the nitrogen tank 76 so that additional nitrogen coolant cools the fuel in the heat exchanger 94 as it flows therethrough.

Figure 4:
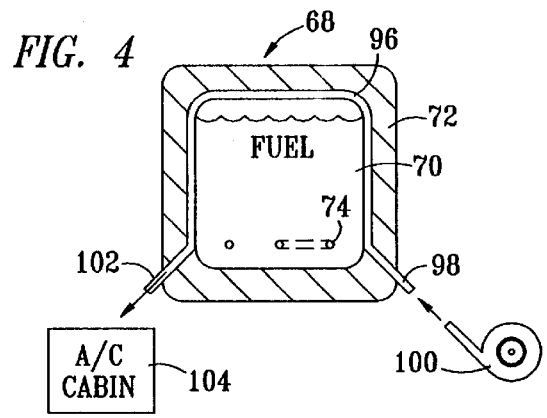
FIG. 4 illustrates a side view of the fuel tank of FIG. 3 used for cooling air for air conditioning.

Referring now to FIG. 4, there is illustrated a jacket 96 which surrounds a portion of the fuel tank 70 and underlies the insulation 72. The jacket 96 has an inlet 98 connected to an air blower 100 for introducing ambient air into the jacket 96. The jacket 96 is provided with an outlet 102 that communicates with a cabin or passenger compartment 104 of the vehicle.

In operation, fuel at elevated or ambient temperatures is introduced into the fuel tank 70 in a normal fashion. The sensor 82 will cause the electronic controls 84 to open the solenoid valve 80 so that nitrogen coolant is introduced through the coils 74. Because of the extremely low temperature of the nitrogen, the fuel is quickly cooled. When the sensor 82 detects that the temperature has reached a preselected level, the electronic controls will actuate the valve 80 so that the flow of nitrogen is cut.

Fuel is drawn from the fuel tank 70 in a normal manner. The chiller 94 provides additional cooling to the fuel prior to introduction into the engine 92. During warm periods when air conditioning is needed, the blower 100 can be activated so that air is circulated within the jacket 96 around the exterior of the fuel tank 70. The low temperature fuel within cools the air as it is passed out of the jacket 96, through the outlet 102, and introduced as air conditioned air into a cabin or passenger compartment 104 of the vehicle. It may be necessary to maintain the temperature of the fuel within the tank 70 above 35° F. to ensure that icing does not occur within the air conditioning system of the vehicle. It may be necessary to recharge the nitrogen tank from time to time as it is depleted.

Figure 5:
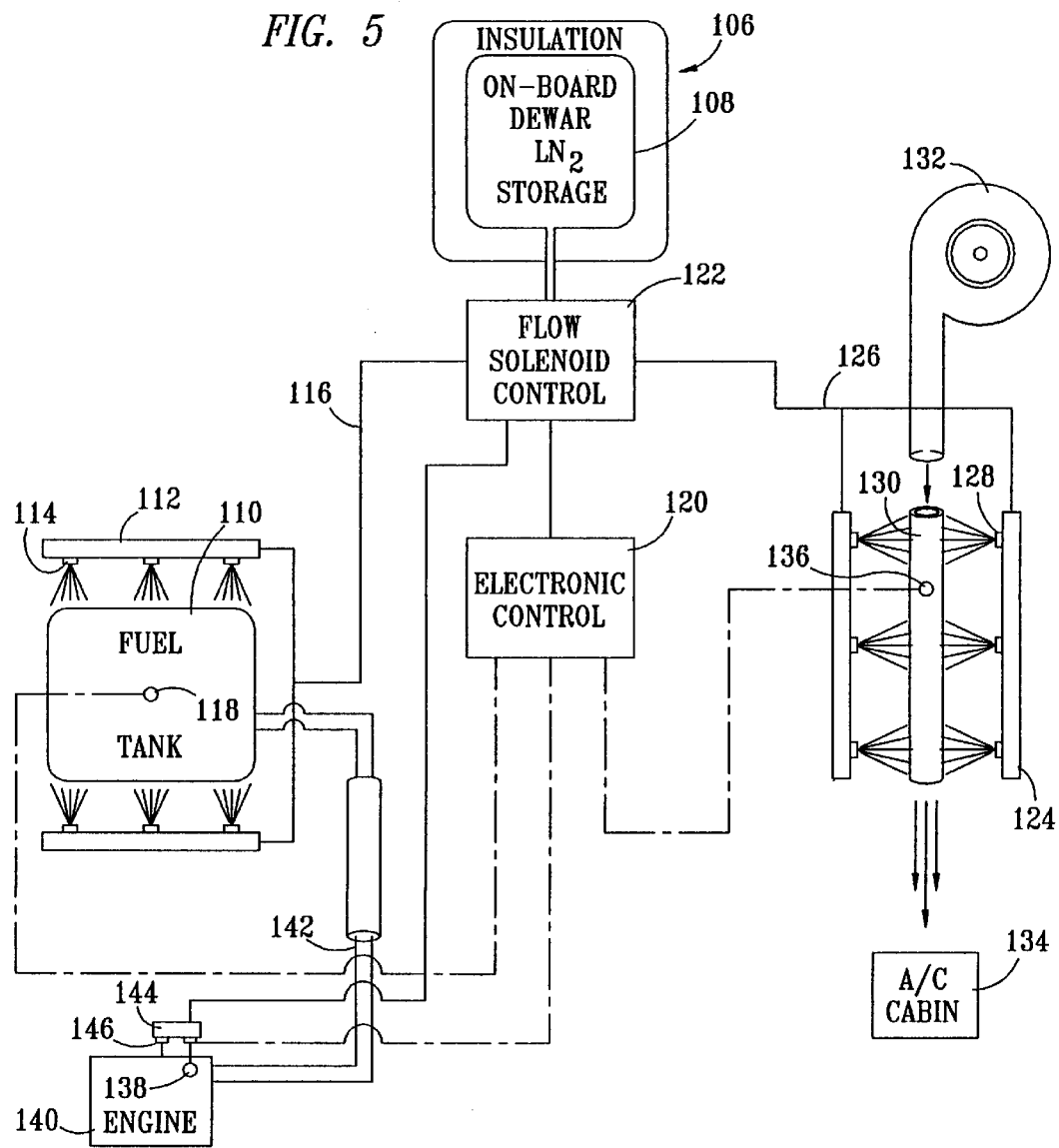
FIG. 5 illustrates a schematic representation view of another embodiment of a refrigeration unit for a fuel tank constructed and used in accordance with the present invention.

Referring now to FIG. 5, there is illustrated another embodiment of an on-board fuel refrigeration system 106. Liquid nitrogen is stored in an on-board Dewar vessel or tank 108. A vehicle fuel tank 110 is, in this case, formed of uninsulated aluminum and surrounded by nitrogen spray manifolds 112 which have a plurality of spray nozzles 114. Nitrogen coolant is supplied to the manifold 112 from the nitrogen tank 108 through a line 116. A sensor 118 monitors the temperature within the fuel tank 110 and is coupled to an electronic controller 120 which actuates a solenoid flow metering system 122 that allows nitrogen to flow through the line 116 to the spray manifold 112.

The metering system 122 splits the flow of the nitrogen from the tank 108 so that some may be directed to spray manifolds 124 through a line 126. The spray manifolds 124 are provided with a plurality of nozzles 128 for directing nitrogen coolant to the exterior of an aluminum pipe 130.

A blower 132 is connected to one end of the pipe 130 for forcing air therethrough. The outlet of the pipe 130 communicates with air ducting to supply cooled air to the cabin or passenger compartment 134 of the vehicle. A temperature probe 136 is provided for sensing the temperature of the air within the pipe 130. The probe 136 is connected to the controller 120 which actuates the flow metering system 122 to regulate the flow of nitrogen to the manifolds 124 in response to changes in air temperature within the pipe 130.

A temperature sensor 138 is also provided on the fuel intake manifold of the vehicle's engine 140. The intake manifold is fed fuel from the fuel tank 110 through insulated fuel lines 142. A nitrogen spray manifold 144 having nozzles 146 is positioned over the exterior of the intake manifold of the engine 140. Nitrogen is supplied to the manifold 144 via line 148 from metering system 122. The metering system 122 is activated by an electronic controller 120 connected to a temperature probe 138 to supply nitrogen to the manifold 144 when the fuel reaches a preselected temperature. It should also be noted that instead of the exteriorly mounted manifold 144, nitrogen may be internally circulated through passageways surrounding the intake manifold of the engine so that the fuel is cooled immediately prior use.

The operation of the device 106 is as follows. Ambient temperature fuel is introduced into the tank 110. The high temperature of the fuel, as sensed by probe 118, then causes the controller 120 to actuate metering system 122 so that nitrogen is supplied from the tank 108 to the manifold 112. The nitrogen is directed to the exterior of the tank 110 so that the fuel is cooled therein to a preselected temperature. When the selected temperature is reached, the controller 120 will cause the metering system 122 to cut off the flow of nitrogen to the manifold 112. As the temperature of the fuel rises, nitrogen is supplied to the manifold 112 for further cooling.

Fuel is then fed from the fuel tank 110 to the engine 140 during use. If the temperature of the fuel to the engine is too high, as measured by the temperature sensor probe 138, nitrogen is supplied to the manifold 144 so that the fuel within the fuel intake manifold of the engine 140 is also cooled prior to introduction into the engine cylinders.

The device 106 also utilizes the on-board nitrogen tanks 108 to cool air for air conditioning. Here nitrogen is supplied to the manifold 124 where it is sprayed onto the exterior of the tube 130. The blower 132 forces air through the tube 130 where it is cooled before it is introduced into the cabin 134. The temperature of the air should be maintained above 35° F. to prevent icing.

Referring now to FIG. 6, there is illustrated a side elevational view of a portable refrigeration unit ("PRU") 150, which is a self contained fuel cooling unit made according to the present invention. As depicted in FIG. 6, the PRU 150 is trailer mounted. The PRU 150 includes an explosion-proof cabinet 152 which is mounted to a trailer chassis 154. A fuel inlet 156 and a fuel outlet 158 are provided for passing fuel into and then from the PRU 150. A fuel pump 160 is provided on the inlet fuel line 156. In some embodiments of the present invention, the pump on the conventional fuel supply may provide sufficient pressure for flowing the fuel through the PRU 150, such that the fuel pump 160 is only required in high flow conditions.

The PRU 150 further includes a heat exchanger 162 to which the fuel inlet 156 is connected. A flow path 164 connects the heat exchanger 162 in fluid communication with a water separation unit 166, which preferably is of the type having a coalescing filter 168. In other embodiments, other types of water separators may provide the water separator unit 166 of the PRU 150, such as gravity type separators and various other types. In the preferred water separation unit 166, an absorption media 168 is provided which swells upon contact with moisture. When excessive moisture is absorbed by the absorption media 168, the PRU 150 will require servicing.

A power unit 170 provides the motive power for operation of the PRU 150. The power unit 170 is a preferably a self-contained industrial diesel engine, which is configured to operate on the jet fuel being chilled by the PRU 150. A radiator 172 is provided for cooling a liquid coolant used within the power unit 170. The radiator 172 is of the type used with conventional diesel engines. The power unit 170 drives a hydraulic drive pump 174. The hydraulic drive pump 174 is connected by hydraulic lines 176 and 178 to a low temperature chiller 180. The hydraulic pump 174 moves hydraulic fluid through the hydraulic lines 176 and 178 to drive compressors included in the low temperature chiller 180. An electronic control unit 182 monitors and controls operation of the various components of the PRU 150. The electronic control unit 182 preferably includes a programmable controller, such as a microprocessor of the type used conventional personal computers and process controllers. The chiller 180 is connected to heat exchanger 162 by flow paths 181 and 183.

Referring now to FIG. 7, there is illustrated a schematic diagram of a two-stage chiller which is preferably utilized to provide the low temperature chiller 180 of the PRU 150. The chiller 180 includes a high stage 184 and a low stage 186. The high stage 184 includes a compressor 188, which is preferably a screw type compressor that is hydraulically driven by the power unit 170 and the hydraulic drive pump 174. The compressor 188 causes the refrigerant to flow within the high stage section 184. The refrigerant passes from the compressor 188 to a condenser 190. The condenser 190 is air cooled, with a fan forcing the air to pass through the condenser 190. Ambient air provides a heat sink. The refrigerant passes through the condenser 190, through a receiver 192 and then through a filter/dryer unit 194. The refrigerant then passes from the filter/dryer unit 194 and through a first side of a liquid/suction interchanger 196. A solenoid valve 198 controls the flow of the refrigerant through the high stage 184. The refrigerant will then flow through the thermal expansion valve 200, through a distributor 202 and to an evaporator/condenser 204. The high stage refrigerant passes through the evaporator side of the evaporator/condenser 204, through a second side of the liquid/suction interchanger 196 and to a suction filter 206 on the inlet of the hydraulically powered compressor 188.

The low stage 186 includes a hydraulically powered compressor 208, which is preferably a screw type compressor. The discharge of the compressor 206 is connected to an air cooled desuperheater 210, which is preferably cooled by fan forced air, such that ambient air provides a heat sink. Refrigerant then passes from the air cooled desuperheater 210 and through the low stage side of the evaporator/condenser 204 for transferring heat from the low stage refrigerant to the high stage refrigerant. The low stage refrigerant then passes through a receiver 212 and a filter dryer 214, and through a liquid/suction interchanger 216. A solenoid valve 218 is located after the liquid/suction interchanger 216 for controlling the flow of the refrigerant through the low stage 186. The low stage refrigerant then passes through a thermal expansion valve 220, a distributor 222 and a first side of an evaporator 224. The refrigerant passes from the evaporator 224, back through the liquid/suction interchanger 216 and then through a suction filter 226. The low side refrigerant then passes from the suction filter 226 and into the inlet of the compressor 208.

A cooling fluid preferably passes through a second side of the evaporator 224. In other embodiments, the fuel may be directly cooled in the evaporator 224. Heat is transferred from the cooling fluid to the second stage refrigerant passing through the second stage 186. The cooling fluid, after passing through the evaporator 224, passes into a storage reservoir 230. A pump 232 is connected to the outlet of the storage reservoir 230. A bypass check valve 236 is connected to the line extending between the storage reservoir 230 and the pump 232. The check valve 236 will pass the cooling fluid to the bypass pump 234 in response to the bypass pump 234 being actuated to circulate the cooling fluid therethrough. The check valve 236 will pass the cooling fluid from the discharge of the storage reservoir 230, to the inlet of the bypass pump 234, and then to the cooling fluid inlet of the evaporator 224.

Figure 8:
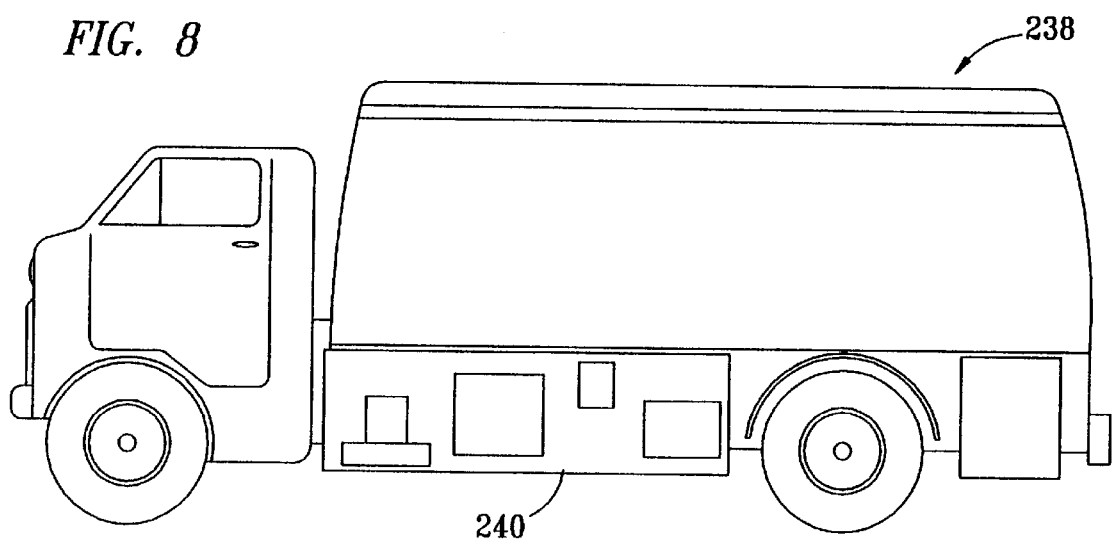
FIG. 8 illustrates a side elevational view of an aircraft refueller truck which includes a portable refrigeration unit which is used in accordance with the present invention.

The PRU 150 may be towed behind a conventional vehicle, or the refrigeration components thereof may be mounted to the chassis of a conventional re-fueling truck, as shown in FIG. 8. When the PRU 150 is used in conjunction with a conventional fuel truck, the PRU 150 will take advantage of the truck's onboard pumps, filters and water separation unit, which are typically mounted on such fuel trucks. After lowering the temperature, the fuel is superfiltered and super-water separated, then brought back to the truck where it is again filtered and separated and immediately prior to delivery of the aircraft.

In the preferred embodiment of the low temperature chiller 180 of the PRU 150, a conventional refrigerant is utilized rather than liquid nitrogen. The refrigerant is preferably HFC-507/R-23. Other types of refrigerant may be utilized such as SYLTHERM XLT liquid or d-LIMONENE. The PRU 150 is sized for processing from 100 to 800 gallons per minute of liquid jet fuel, grades A and B. The physical size of the PRU 150 is 18 feet long, by 8 feet wide, by 8 feet high. The weight is approximately 10,500 pounds. The power unit 170 is rated to 160 horsepower. The estimated BTU load of the PRU 150 at 100 gallons per minute is estimated to be 1,924,230 BTUs per hour. The PRU 150 is microprocessor controlled, and includes the initiation of a fail safe shut down should operating condition sensors indicate a malfunction or unsafe circumstances. The PRU

150 will automatically shut down at a fuel pressure of 65 PSI. The fail safe automatic shut down temperature is −55° F. for the refrigerants, and −33° F. for the process liquids. Kerosene of a specific heat of 0.50 and specific gravity of 0.777 is utilized for the cooling fluid, which transfers heat between the low temperature chiller 180 and the heat exchanger 162. The refrigerant transfer fluid outlet temperature is preferably −40° F. Design pressures are 50 PSI, at design refrigerant flow rates of 200 gallons per minute. The normal operating ambient temperature range of the unit is from 32° F. to 105° F.

It should be noted, that in other embodiments of the present invention, the PRU 150 may be used to cool fuel within an onboard fuel tank of a vehicle, such as the tank 70 of FIG. 3. Two options are possible. One option is to circulate fuel from the tank 70 through the PRU 150, connecting the inlet 156 and the outlet 158 of the PRU 150 to the tank 70. A second option is to pass an intermediate cooling fluid between the PRU 150 and the heat exchanger 74 of the tank 70. Refrigerant from the chiller 180 may also be circulated directly through the cryogenic heat exchanger 74, or an intermediate cooling fluid may be circulated from the outlet 158, through heat exchanger 74, and then back through the inlet 156 to the PRU 150. The pressure relief valve 86 of the tank 70 would, of course, be removed and replaced by a flow coupling rather than venting a coolant or a cooling fluid to the atmosphere. In other embodiments of the present invention, a refrigeration unit similar to the PRU 150 described above may be skid mounted or permanently mounted at an aircraft facility.

Referring now to FIG. 8, there is illustrated a side elevational view of an aircraft refueller truck 238 which includes a portable refrigeration unit 240, which is mounted to the chassis of the truck. The refrigeration unit 240 includes the processing components of the PRU 150, except that they are mounted to the chassis of the truck 238 rather than a trailer.

In yet other embodiments of the present invention, expendable refrigerants other than liquid nitrogen may be used for cooling fuel. As used herein, expendable refrigerants are those refrigerants which are used once, then typically released as gases to the atmosphere. Expendable refrigerants may be provided by liquid nitrogen, carbon dioxide, argon or liquid helium. Such expendable refrigerants can be utilized in the above described embodiments in place of liquid nitrogen.

As can be seen, there are several advantages achieved by the above-described invention. The refrigerated fuel has a much smaller density so that more fuel may be stored within fuel tanks. This is particularly advantageous for large commercial jet aircraft, which require great amounts of fuel. There is also particular application with vehicles having reciprocating-type engines. Refrigerated fuel ultimately increases engine efficiencies, performance and reduces exhaust emissions. Modern automotive technology senses the presence of refrigerated fuel and systematically converts its extra-energy resulting from its increased density into improved engine performance, such as increased fuel mileage and/or reduced exhaust emissions through more lean fuel/air mixtures.

Introduction of a refrigerated fuel into the engine initially results in a small amount of unburned fuel being exhausted. Modern-day automotive electronic computer-controlled systems monitor levels of unburned fuel by monitoring pollutant levels in the engine exhaust. As refrigerated fuel intentionally creates a situation where a small amount of fuel is initially wasted, it is so identified, and induction mixtures are systematically leaned-back to a more advantageous ratio and maintained. This automatic lean-burn induction capability directly relates to valuable improvements in engine performance, efficiency and emissions.

Aircraft reciprocating engine technology does not use modern computer electronic monitoring devices to monitor levels of unburned fuel residue in exhausts. Refrigerated fuel offers aircraft significant advantage. Aircraft benefit through more-lean or more-rich fuel/air mixtures as accomplished by the pilot in flight through manual adjustment. As in the automotive application, extra energy becomes available through a more-dense refrigerated fuel. In a refrigerated state, the fuel itself contains additional energy per measurement and therefore offers more available engine power at take-off and in cruise flight through more rich-mixtures or the engine can be manually leaned-back, providing a more-lean and efficient fuel burn, increased economy, extended range and reduced emissions.

Aircraft engines are more susceptible to heat-related operational problems due to less cooling airflow during ground operations at low rpm settings and are difficult to re-start after engine shutdown. Refrigerated fuel reduces difficult hot re-starts.

Both automotive and aircraft applications benefit through the use of refrigerated fuel, insulated fuel tanks and/or dedicated systems intended to create and/or maintain appropriate refrigerated fuel temperatures. The cold nature of these fuel tanks is used to further benefit the operation of the automobile or aircraft. The fuel tank provides a source of cool air. Outside air is circulated through thermal corridors or air passageways, in contact with the fuel tank or through ducting, toward engine compartments and/or passenger areas needed to be air conditioned. This low temperature air source does not need energy derived from engine power, enhancing engine efficiency.

Although preferred embodiments have been described in detail, it should be understood that various changes, substitutions and alterations can be made therein without departing from the spirit and scope of the invention as defined by the appended claims.

What is claimed is:

1. A method of fueling an aircraft having an onboard fuel storage tank, comprising the steps of:

providing a liquid fuel for fueling the aircraft;

transferring the fuel to a ground location;

cooling the fuel to reduced temperatures externally of the aircraft on the ground and substantially less than ambient temperature so that the volume of the fuel is reduced;

transferring the fuel to the aircraft and storing the fuel in the onboard storage tank while the fuel is at the reduced temperatures, the reduced temperature and volume of the fuel thereby increasing the energy value of the fuel per unit volume.

2. The method of claim 1, wherein the fuel is cooled to temperatures not substantially less than 32° F.

3. The method of claim 1, wherein the fuel is cooled to temperatures which are not substantially less than 40° below ambient temperatures.

4. The method of claim 1, wherein the fuel is cooled to temperatures between about 0° F. and −50° F.

5. The method of claim 1, wherein the fuel is cooled to temperatures above the pour point of the fuel.

6. The method of claim 1, wherein the onboard fuel storage tank is insulated.

7. The method of claim 1, wherein the fuel is cooled prior to introducing the fuel into the storage tank to substantially less than ambient temperature so that the volume of the fuel is reduced, thereby allowing more fuel to be held per unit volume of the storage tank and increasing the energy value of the fuel per unit volume.

8. The method of claim 1, further comprising the step of cooling the fuel while in the onboard storage tank.

9. The method of claim 8, wherein the fuel is cooled by providing an internal heat exchanger within the onboard fuel storage tank and passing a coolant fluid having a temperature below the reduced temperatures through the heat exchanger.

10. The method of claim 8, wherein the fuel is cooled by applying a coolant fluid having a temperature below the reduced temperatures to the exterior of the onboard fuel storage tank.

11. The method of claim 9, wherein the coolant fluid is an expendable refrigerant.

12. The method of claim 10, wherein the coolant fluid is an expendable refrigerant.

13. The method of claim 1, further comprising the step of transferring the fuel from the onboard fuel storage tank to the engine while at the reduced temperatures.

14. A method of fueling an aircraft having a fuel storage tank and an engine, comprising the steps of:

provideing a liquid fuel for fueling the aircraft;

cooling the fuel externally to the aircraft at a ground location to reduced temperatures substantially less than ambient temperature so that the volume of the fuel is reduced;

transferring the fuel into the storage tank of the aircraft while the fuel is at the reduced temperatures, the reduced volume of the fuel thereby allowing more fuel to be held in the storage tank of the aircraft and increasing the energy value of the fuel per unit volume; and transferring the fuel from the storage tank to the engine of the aircraft.

15. The method of claim 14, wherein the fuel is cooled by:

providing a coolant fluid having a temperature below the reduced temperatures;

providing the fuel in a storage vessel;

providing a heat exchanger;

transferring a portion of the fuel from the storage vessel to the heat exchanger; and utilizing the coolant fluid in the heat exchanger to cool the amount of fuel as the amount of fuel is passed through the heat exchanger so that the amount of fuel is cooled to the reduced temperatures.

16. The method of claim 15, wherein the coolant fluid includes a second amount of fuel.

17. The method of claim 15, wherein the heat exchanger is mounted to a mobile unit that can be selectively positioned near the storage vessel and aircraft.

18. The method of claim 15, wherein the coolant fluid is cooled by means of a refrigeration unit.

19. The method of claim 15, wherein the coolant fluid is an expendable refrigerant.

20. The method of claim 14, wherein the fuel is cooled to temperatures less than about −15° F.

21. The method of claim 14, wherein the fuel is cooled to temperatures between about −15° F. and −50° F.

22. The method of claim 14, wherein the fuel is cooled to temperatures below the flashpoint of the fuel.

23. The method of claim 14, wherein the step of transferring the fuel from the storage tank to the engine of the aircraft includes the step of passing the fuel into the engine while at the reduced temperatures.

24. A fuel delivery system for delivering fuel to an aircraft, comprising:

a fuel storage tank on the ground;

a fuel line connected to said storage tank for delivering fuel to a heat exchanger from within said storage tank;

a heat exchanger connected to said fuel line for receiving and cooling the fuel from said fuel storage tank to reduced temperatures, which are less than ambient temperatures, wherein the cooled volume of the fuel is reduced below the volume of the fuel at atmospheric temperatures; and a second fuel line connected to said heat exchanger for delivering the fuel to the aircraft at the reduced temperatures.

25. The fuel delivery system of claim 24, and further comprising:

a chiller for compressing and expanding a refrigerant fluid to transfer heat from the fuel to a heat sink; and a cooling fluid circulation system which circulates a cooling fluid between said chiller and said heat exchanger for transferring heat therebetween and increasing the energy value of the fuel per unit volume.

26. The fuel delivery system of claim 25, further comprising a water separation unit connected between said heat exchanger and said second fuel line for removing water from the fuel at the reduced temperatures.

27. The fuel delivery system of claim 24, further comprising a water separation unit connected between said heat exchanger and said second fuel line for removing water from the fuel at the reduced temperatures.

* * * * *